Figure 1:
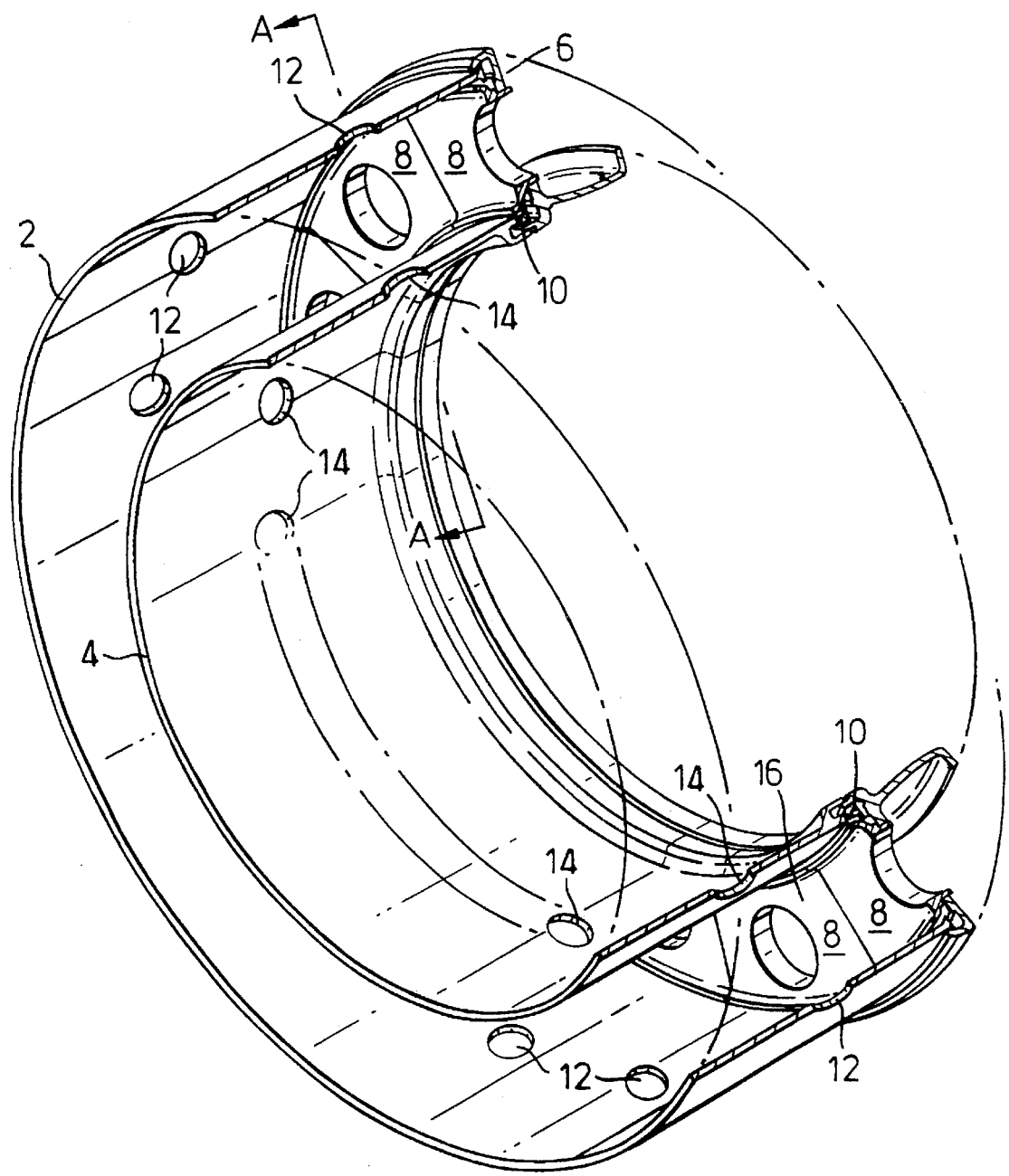

United States Patent [19]

Jones

[11] Patent Number: 5,609,031
[45] Date of Patent: Mar. 11, 1997

[54] COMBUSTOR ASSEMBLY

[75] Inventor: Leighton Jones, Bristol, England

[73] Assignee: Rolls-Royce plc, London, England

[21] Appl. No.: 567,587

[22] Filed: Dec. 5, 1995

[30] Foreign Application Priority Data

Dec. 8, 1994 [GB] United Kingdom ............... 9425038

[51] Int. Cl.$^6$ ............................................. F02C 1/00
[52] U.S. Cl. ................................ 60/753; 60/39.32
[58] Field of Search ................. 60/39.31, 39.32, 60/752, 753, 722

[56] References Cited

U.S. PATENT DOCUMENTS

| | | | |
|---|---|---|---|
| 3,854,503 | 12/1974 | Nelson et al. | 60/753 |
| 3,880,575 | 4/1975 | Cross et al. | 60/753 |
| 4,363,208 | 12/1982 | Hoffman et al. | 60/753 |

FOREIGN PATENT DOCUMENTS

| | | |
|---|---|---|
| 0471438 | 2/1992 | European Pat. Off. . |
| 75414 | 3/1991 | Japan ................................ 60/752 |
| 1423052 | 1/1976 | United Kingdom . |

Primary Examiner—Charles G. Freay
Attorney, Agent, or Firm—Oliff & Berridge

[57] ABSTRACT

Gas turbine engine combustor designs are tending to higher operating temperatures and, therefore, utilisation of high temperature materials such as, for example, ceramics, composite material and high temperature nickel alloys. However use of these materials for combustor components leads, in turn, to problems of how to join together those components. A high temperature material combustor barrel and a similar combustor head heatshield are joined to a metal or metal alloy combustor head by means of a lip around the circumference of the head swaged or rolled onto a lip on the barrel trapping the heatshield between them.

9 Claims, 4 Drawing Sheets

COMBUSTOR ASSEMBLY

The invention relates to a gas turbine engine combustor assembly. In particular, it concerns the joining of components formed in high temperature materials which are normally unweldable and which may have substantially different thermal expansion coefficients.

Combustor operating temperatures have up to recently been limited by material performance and individual cylindrical can combustors, can-annular or annular combustors have been made of metal alloys which are easy to join usually by welding. As peak combustion temperatures have risen in some combustor designs beyond the melting point of the conventional alloys component cooling techniques and higher performance materials have been developed. Often these materials, such as ceramics, composite materials and some of the higher performance nickel alloys, are unweldable and alternative joining techniques have had to be used.

An example of these developments is the well known design of combustor in which the combustor chamber head is shielded by a heatshield segments or tiles carried on the inner face of the metering panel in the head. These heatshield tiles are made of an unweldable alloy, or perhaps a ceramic material, and are mounted by means of stud fasteners. At least one stud or spaced pedestal is formed on the rear face of the heatshield and this carries a threaded shank which is made long enough to pass through a clearance hole in the metering panel and be secured by a lock nut on its rear face. Although this method involves a weight penalty it has been judged acceptable against overall combustor weight given the additional combustor performance achieved.

However, the continuing trend in combustor design is to reduce the physical size of combustors as well as to further increase combustion temperatures. For safety reliability reasons there is a minimum size for threaded stub and locking nut fasteners which therefore contribute an increasingly significant proportion of combustor weight. Furthermore, they inflate the combustor component count at a time when there is an overall trend to reduce the number of components in an engine.

The present invention seeks to overcome these drawbacks by providing a combustor assembly in which component joints are simpler, lighter and which involves fewer components than hitherto.

According to the present invention there is therefore provided a gas turbine engine combustor assembly comprising:

a combustor barrel including a cylindrical portion having an upstream end formed with a raised rim, a combustor head including a metering panel formed with a deformable lip and a heatshield, wherein the barrel, metering panel and heatshield are assembled with portions of the heatshield trapped between the metering panel and the barrel by the deformable lip on the panel being swaged or rolled to engage the raised rim on the barrel.

Preferably there is further provided a gas turbine engine combustor assembly of this kind for an annular combustor wherein the barrel forms a radially outer wall of the combustor, the combustor head includes an annular metering panel and the deformable lip is formed as part of the radially outer circumference of the panel and the raised rim is the upstream margin of the barrel.

In a combustor assembly which comprises a plurality of part-annular heatshield segments arranged in an annular array, preferably the trapped portions of the heatshield comprise radially inwardly and outwardly extending projections.

Figure 2:
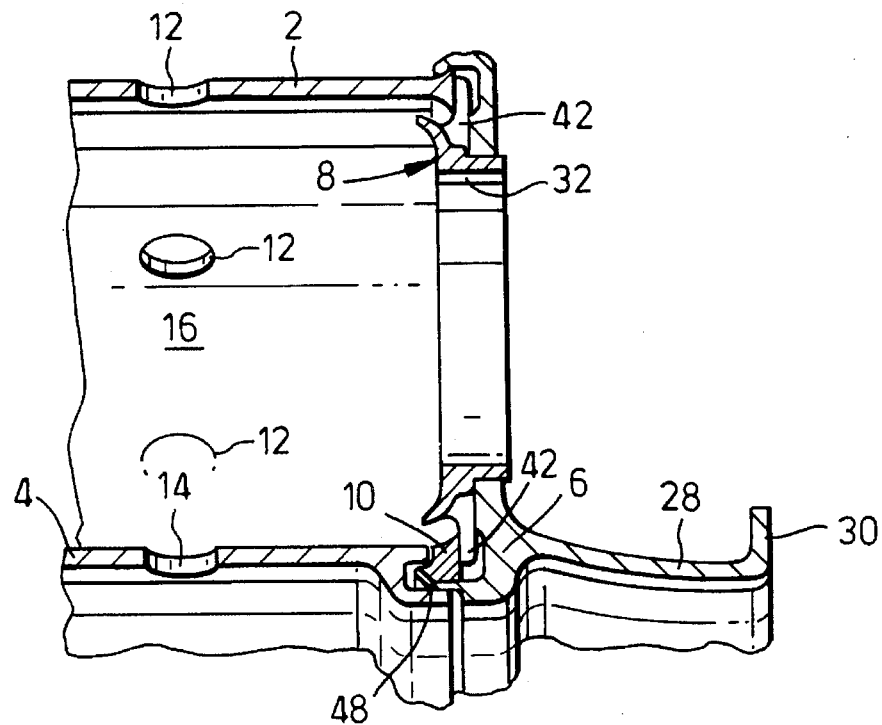
Figure 4:
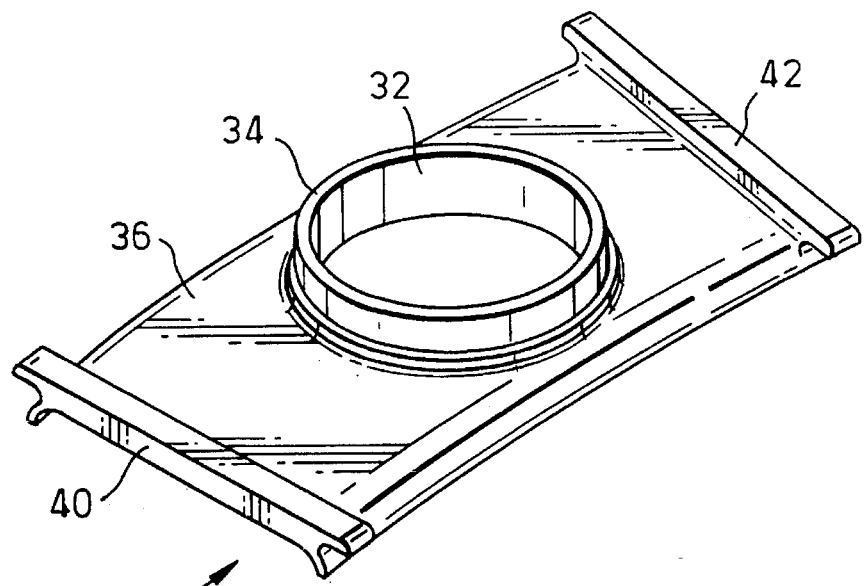
Figure 3:
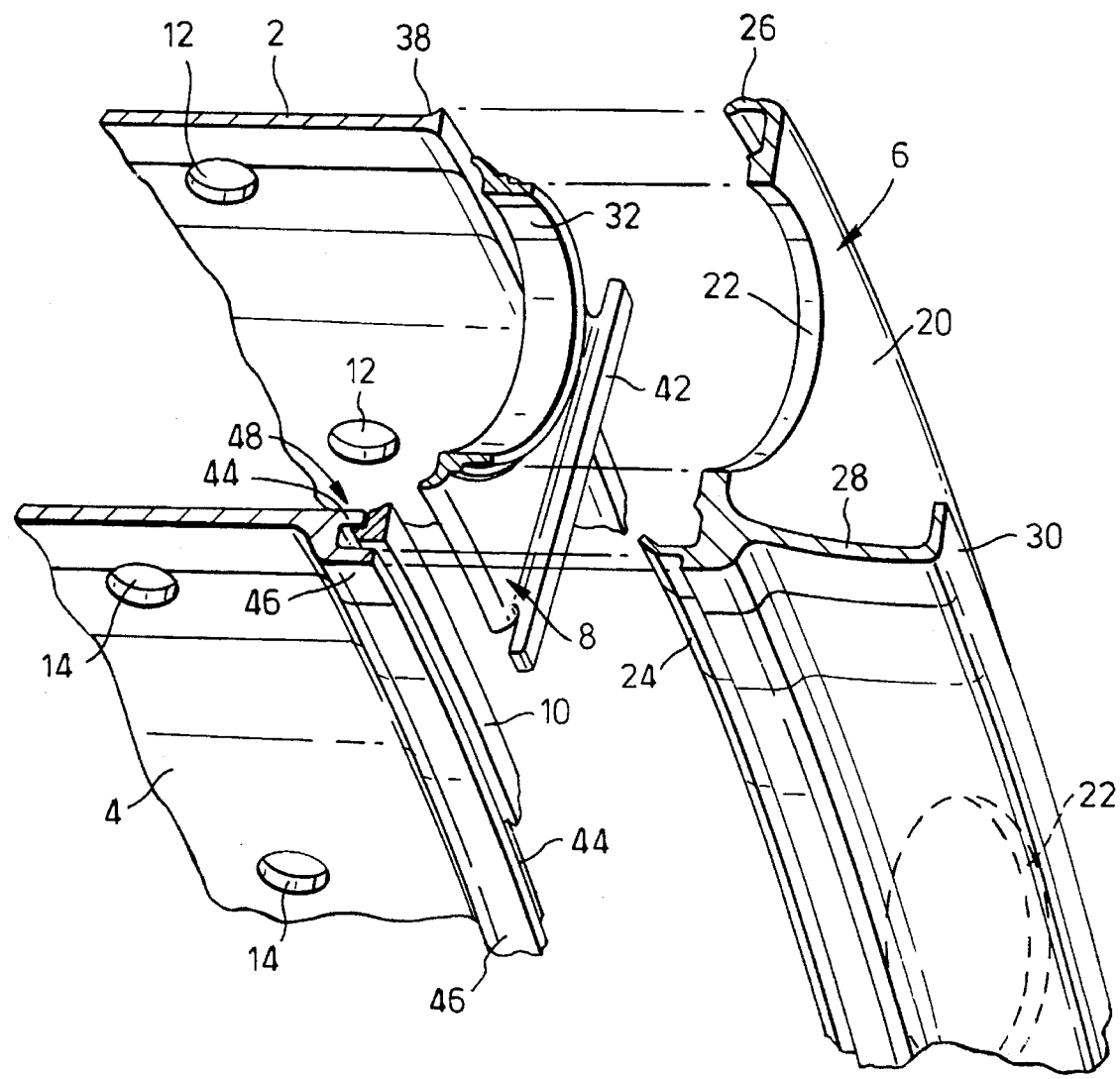
Figure 5:
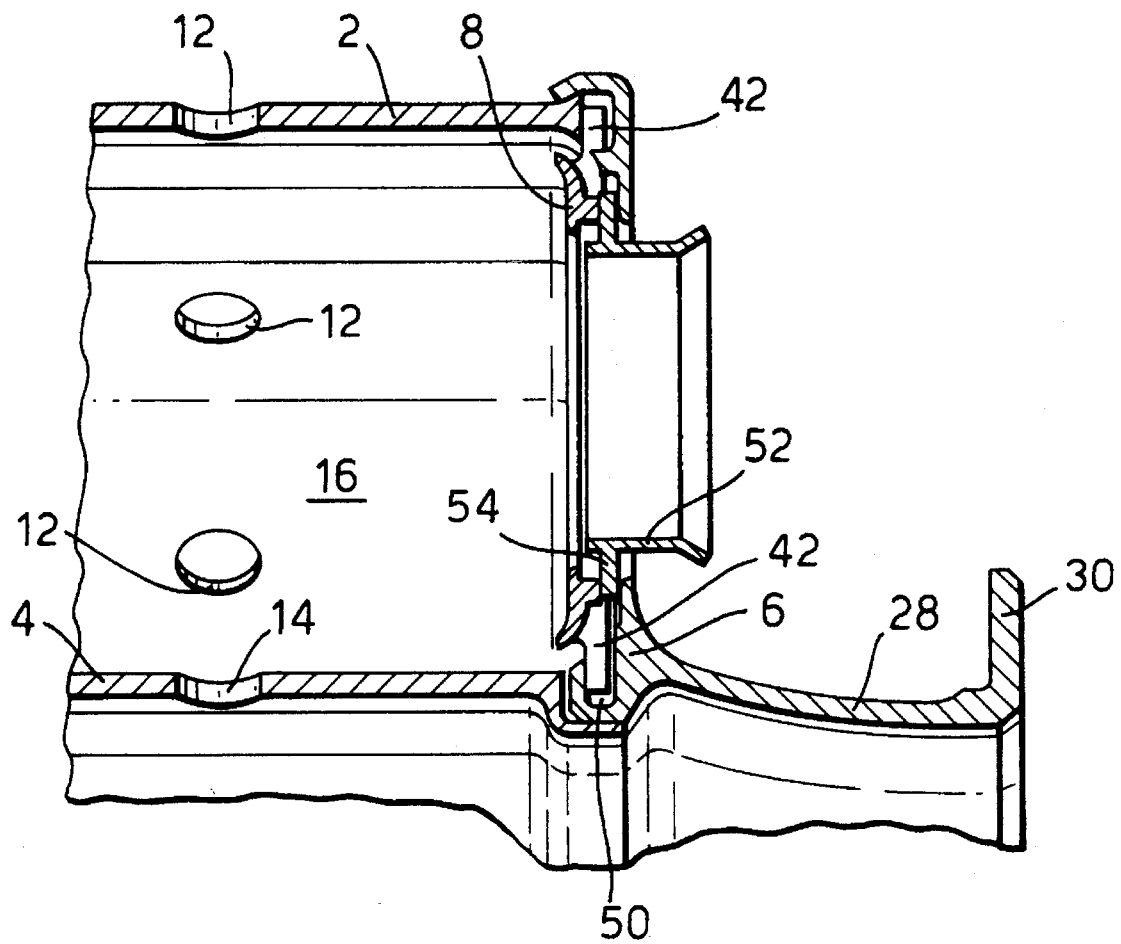

The invention and how it may be carried into practice will now be described by way of example with reference to the accompanying drawings in which:

FIG. 1 is a part-sectioned perspective view of the upstream end of a high-temperature combustion chamber, FIG. 2 is a transverse section view on a radial plane AA in FIG. 1, FIG. 3 is an disassembled version of FIG. 2 showing individual components, FIG. 4 is a perspective view of one of the heatshield segments in the previous drawings, and FIG. 5 is a transverse section view similar to FIG. 2 of a second embodiment.

Referring now to the drawings, there is shown in FIG. 1 part of an annular combustor assembly in part-sectioned perspective view looking upstream towards the head of the combustion chamber. Parts of the gas turbine engine, such as compressor stages, turbine stages, connecting shaft or shafts and even structural parts surrounding the combustion chamber but which do not constitute parts involved in the present invention are omitted for clarity.

Thus, there is shown in the drawing a combustion chamber outer barrel 2, an inner barrel 4, an air entry metering panel 6 and a heatshield generally indicated at 8 which consists of a plurality of heatshield segments of the same reference. The assembly of FIG. 1 also includes a retaining ring 10. The upstream boundary of the combustion zone 16 is formed by the metering panel 6 which is protected on the hot side, ie facing the combustion zone 16, by the heatshield 8.

Both the outer barrel 2 and inner barrel 4 are basically cylindrical in form, at least over the axial length depicted, and are disposed co-axially. These two components are cast in a high temperature specification cobalt-based alloy such as MARM 002, although other alloy materials having as good as or better temperature capability may be used. Alternatively, one or both barrels 2,4 may be formed in a ceramic or composite material eg a metal matrix/ceramic composite.

The barrels 2,4 are formed with a multiplicity of distributed apertures therethrough some of which are shown at 12,14 for air entry into a combustion zone 16 which occupies the annular space between the barrels 2 and 4. This air which supports combustion is ducted from a compressor not shown in the drawings and travels generally from right to left in FIGS. 1 to 3 of the drawings. A proportion of the air is directed through a combustor head region and through fuel/air mixing devices, for example, air-spray burners which are also not shown. There are a plurality of such burners spaced apart around the metering panel 6 upstream end of the combustion zone 16 and these may project through or discharge through apertures in the metering panel and heatshield.

The arrangement for mounting the combustor components absorbs expansion of the individual components thereby allowing a certain amount of relative movement between some of the components while others are secured together using joining techniques which take into account the non-weldability of the component materials. These component materials may therefore include non-weldable, high-temperature alloys as well as ceramic and composite, eg metal reinforced ceramic, materials.

The metering panel 6 is most likely to be formed of a metal alloy, probably a nickel alloy, which may be a high-temperature alloy but this is not absolutely necessary because the panel is in a relatively cool environment being wholly within a compressor delivery airflow. The panel 6 comprises a single annular member 20 in which are formed a multiplicity of spaced apart burner receiving apertures 22. The entire length of the inner and outer circumferences of the annular member 20 have integral upstanding lips 24,26 respectively. These are both on the same side of the member and, in the assembly, extend in the downstream direction. On the opposite side of the member 20 and adjacent its inner circumference extending in an upstream direction is a roughly cylindrical flange 28 which terminates in a radially, outwardly turned lip 30 (FIG. 2). By means of this lip the flange 28 may be attached, eg bolted, to the rear at downstream end of the compressor or combustion chamber casing (not shown). The metering panel 6 is thereby fixed and supported within the engine assembly. It is to be understood that the style of combustion chamber, whether it is axial, reverse flow etc, is not limiting to the invention.

The heatshield 8 is located against the hot face, ie combustion-zone side, of the metering panel 6 and has formed in it burner-receiving apertures 32. The apertures may be defined by a short length of cylindrical wall 34 upstanding from the plane surface portion 36 of the heatshield. This cylindrical wall being dimensioned externally to fit closely into the metering panel apertures 22 and internally to receive the fuel/air mixture burners (not shown) which may include sealing rings. The heatshield may be formed as a single annular member, in which case dimensions and tolerances must incorporate allowance for differential thermal expansion between the heatshield and the metering panel. However, it is preferred to construct the heatshield 8, as shown in FIGS. 1 and 4 of the drawings, as a multiplicity of part-annular segments. For example, there may be a total of sixteen equal segments each subtending an angle of 22.5° at the centre of the annulus. It is further preferable that this is equal to or a multiple of the number of burners. Thus, in a combustor having sixteen heatshield segments and sixteen burners each segment is formed as illustrated in FIG. 4, but in a combustor having sixteen heatshield segments and eight burners half of the segments are as shown in FIG. 4 and half of them are solid and plain.

Thus, to summarise the annular metering panel 6 maybe constructed in a conventional nickel alloy and is washed in all surfaces by compressor delivery air. The panel supports the head of the combustion chamber providing axial location through flange 28 and must carry at least some of the loads on the combustor barrels. Thus, being made of a suitable alloy the panel will be subject to substantial thermal expansion. The combustor barrels 2,4 will be expected normally to operate at a substantially higher temperature than metering panel 6 since the barrels are exposed to direct radiation from the combustion process whereas the panel 6 is shielded by heatshield 8. The invention, therefore, is intended to accommodate the requirement of attaching the components of dissimilar materials, some of which are unweldable and including some ceramic components which give rise to significant differential thermal expansions.

The solution proposed by the invention is to join one of the combustor barrels, in the illustrated embodiment the outer barrel 2, to the metering panel by means of a swaged lip 26. The barrel 2, which it will be appreciated towards the upstream end adjacent to the metering panel is cylindrical, is provided with a thickened annular rim 38 which forms a raised margin, ie increased diameter, around the entire outer circumference. This raised rim 38 and the annular lip 26 are of a push fit assembly and the distal end of the lip is rolled or swaged to positively engage the rim 38 and prevent disassembly. Preferably the heatshield segments 8 are clamped in this assembly.

Each of the part-annular heatshield segments is formed with radially extending locating legs 40,42 the radially outer ends of which are interposed between the combustion side face of metering panel 6 and the end face of rim 38 on combustor barrel 2. This positively locates the outer circumference of the segmented heatshield.

The inner combustor barrel 4 is located by but not fixed with respect to the inner radius circumference of the annular metering panel 6. Thus, a certain amount of axial movement and differential thermal expansion is permitted. The location of the barrel is provided by two axially extending projections 44,46 spaced apart by a short distance and running the entire circumference of the upstream end of barrel 4. The space between these lips 44,46 is used to locate an annular spigot 48 formed by a projecting portion of ring 10 and the inner circumferential lip 24 on panel 6.

The radially inner ends of heatshield segment legs 40,42 fit within the radial space between the circumferences of metering panel lips 24,26 with an expansion space at the radial inner circumference. The ring 10 is butted up to the radially inner ends of these heatshield legs 40,42 with the annular projections 48 facing away from the heatshield and the metering panel. The radially inner lip 24 is then rolled or swaged over the inner circumference of the ring. Thus the inner circumference of the heatshield 8 is located relative to the metering panel and relative thermal expansion is permissible by sliding movement of the heatshield supporting legs 40,42 against a face of ring 10. The swaged lip 24 and ring projection 48 are dimensioned to engage the annular space between the barrel projections 44,46 thereby providing radial location of the inner barrel 4 while permitting axial movement.

FIG. 5 shows a second embodiment having an alternative arrangement for retaining the inner circumference of the heatshield segments. This modified arrangement is a development of the arrangement shown in FIGS. 1 and 2 and like parts carry the same references. Basically the modification consists of the omission from the head assembly of the retaining ring 10.

In the arrangement of this second embodiment the load bearing flange 28 which carries the metering panel 6 is formed along its inner circumference, on the side of the combustion zone 16, with an outwardly facing groove 50. This is alternative to the swaged lip 24 running around the inner circumference of the annular metering panel. This inner region of the metering panel, instead of being formed with an upstanding lip which is subsequently swaged over, is formed as a thicker annular region into which the retaining groove 50 is machined. This avoids the inevitable workhardening of the metal which occurs during the swaging process. The heatshield locating legs 42 are slotted directly into the groove 50, this time without the intermediary of a retaining ring. The faces of the legs 42 towards combustion zone 16 engage the corresponding inner face of the groove 50. The opposite face of the groove is undercut to provide clearance to the concealed face of the heatshield to avoid rubbing contact. The depth of groove 50 is also sufficient to accommodate differential expansion movement.

In the particular embodiment of FIG. 5 a revised heatshield design is shown in which the short length of cylindrical wall 34 (see FIG. 4) defining a burner receiving aperture 32 is formed as a separate component 52 instead of as an integral feature. The short cylindrical component 52 carries towards one end an outwardly extending annular flange 54, or radially outwardly extending lugs, which are trapped between the metering panel 6 and heatshield 8 in order to locate the component relative thereto.

I claim:

1. A gas turbine engine combustor assembly comprising:

a combustor barrel including a cylindrical portion having an upstream end formed with a raised rim, a combustor head including a metering panel formed with a deformable lip and a heatshield, wherein the barrel, metering panel and heatshield are assembled with portions of the heatshield trapped between the metering panel and the barrel by the deformable lip on the panel being swaged or rolled to engage the raised rim on the barrel.

2. A gas turbine engine combustor assembly as claimed in claim 1 for an annular combustor wherein the barrel forms a radially outer wall of the combustor, the combustor head includes an annular metering panel and the deformable lip is formed as part of the radially outer circumference of the panel.

3. A gas turbine engine combustor assembly as claimed in claim 2 wherein the heatshield comprises a plurality of part-annular heatshield segments arranged in an annular array.

4. A gas turbine engine combustor assembly as claimed in claim 1 wherein the trapped portions of the heatshield comprise radially inwardly and outwardly extending projections.

5. A gas turbine engine combustor assembly as claimed in claim 2 wherein the annular metering panel is formed with a second deformable lip along its radially inner circumference which second deformable lip is swaged or rolled to partially encapsulate the radially inner circumference of the heatshield.

6. A gas turbine engine combustor assembly as claimed in claim 5 wherein a ring is interposed between the heatshield and the second deformable lip.

7. A gas turbine engine combustor assembly as claimed in claim 1 wherein the heatshield is formed of a material having a substantially lower thermal expansion coefficient than the material of the metering panel.

8. A gas turbine engine combustor assembly as claimed in claim 7 wherein the heatshield is formed of ceramic or composite material and the metering panel is formed of a metal or metal alloy.

9. A gas turbine engine combustor assembly as claimed in claim 1 wherein the combustor barrel is formed of a metal or metal alloy.

* * * * *